United States Patent [19]
Moore

[11] Patent Number: 4,688,841
[45] Date of Patent: Aug. 25, 1987

[54] DRAG REDUCTION DEVICE FOR TRACTOR-TRAILERS

[76] Inventor: Mark A. Moore, 1701 N. Bryant St., No. 24, Little Rock, Ark. 72207

[21] Appl. No.: 872,553

[22] Filed: Jun. 10, 1986

[51] Int. Cl.⁴ ............................................. B62D 35/00
[52] U.S. Cl. ..................................................... 296/1 S
[58] Field of Search .................................. 296/91, 1 S

[56] References Cited

U.S. PATENT DOCUMENTS

| 3,425,740 | 2/1969 | DeVaughn | 296/1 S |
| 3,513,935 | 5/1970 | Noble | 180/124 |
| 4,601,508 | 7/1986 | Kerian | 296/1 S |

FOREIGN PATENT DOCUMENTS

| 3115742 | 11/1982 | Fed. Rep. of Germany | 296/1 S |
| 2509681 | 1/1983 | France | 296/1 S |

OTHER PUBLICATIONS

"Versatech Technical Data", Specification Sheet for VersaTech F/S 0190 Fabric.

*Primary Examiner*—Robert B. Reeves
*Assistant Examiner*—Carol L. Olson
*Attorney, Agent, or Firm*—Hermann Ivester

[57] ABSTRACT

A device for reducing air drag on highway vehicles includes a fabric enclosure mounted on the rear end of the vehicle which is self-inflated by a pressure differential between the outer and inner surfaces of the fabric enclosure created by the forward movement of the vehicle. The enclosure includes an inner flat fabric web and an outer shaped fabric web in a frame which is removably secured to the vehicle by mounting pins extending through hingedly mounted angles. The device may also be mounted on the rear of the forward trailer of a tandem trailer or behind the cab of a tractor-trailer having a cab mounted fairing device.

3 Claims, 7 Drawing Figures

DRAG REDUCTION DEVICE FOR TRACTOR-TRAILERS

BACKGROUND OF THE INVENTION

1. Field of the Invention

The present invention relates generally to devices for reducing the amount of air drag on a moving vehicle, and more particularly but not by way of limitation, to devices for reducing the amount of air drag (i) at the rear of a moving tractor-trailer, (ii) at the section between tandem trailers, and (iii) behind the cab of a tractor-trailer equipped with a cab mounted fairing device.

2. Description of the Prior Art

It is well known that as a vehicle, such as a conventional tractor-trailer combination having a substantially flat, rectangular rear end, travels along a highway, a significant amount of air drag at the rear of the vehicle is created. The passage of the vehicle through the atmosphere creates an area of low pressure at the rear of the vehicle, causing drag on the vehicle and increasing the rate of fuel consumption.

Reduction of the rearward air drag on such highway vehicles has been attempted with a number of devices. Examples are contained in U.S. Pat. Nos. 4,142,755 issued to Keedy; 4,214,787 issued to Chain; and 4,401,338 issued to Caldwell.

SUMMARY OF THE PRESENT INVENTION

An object of the present invention is to reduce the amount of air drag that operates at the rear and intermediate sections of a tractor-trailer or other highway vehicle and thereby decreases fuel consumption. The invention provides a web enclosure, or envelope, mounted on the rear and/or at intermediate sections of a tractor-trailer or other highway vehicle. The web enclosure is self-inflated to a drag reducing shape by a pressure differential generated between the outer and inner web surfaces as the tractor-trailer moves forward. The web enclosure is removable to provide access to the trailer.

A rigid frame is provided on which to the web enclosure is mounted. The frame secures the enclosure to the vehicle and provides means for easy attachment and removal.

During travel at highway speeds, the web enclosure inflates to provide a generally smooth air-flow surface which substantially reduces eddy currents and other flow aberrations as the vehicle moves through the air. Fuel consumption is thereby reduced with the present collapsible, cost efficient device.

DESCRIPTION OF THE PREFERRED EMBODIMENTS

Figure 1:
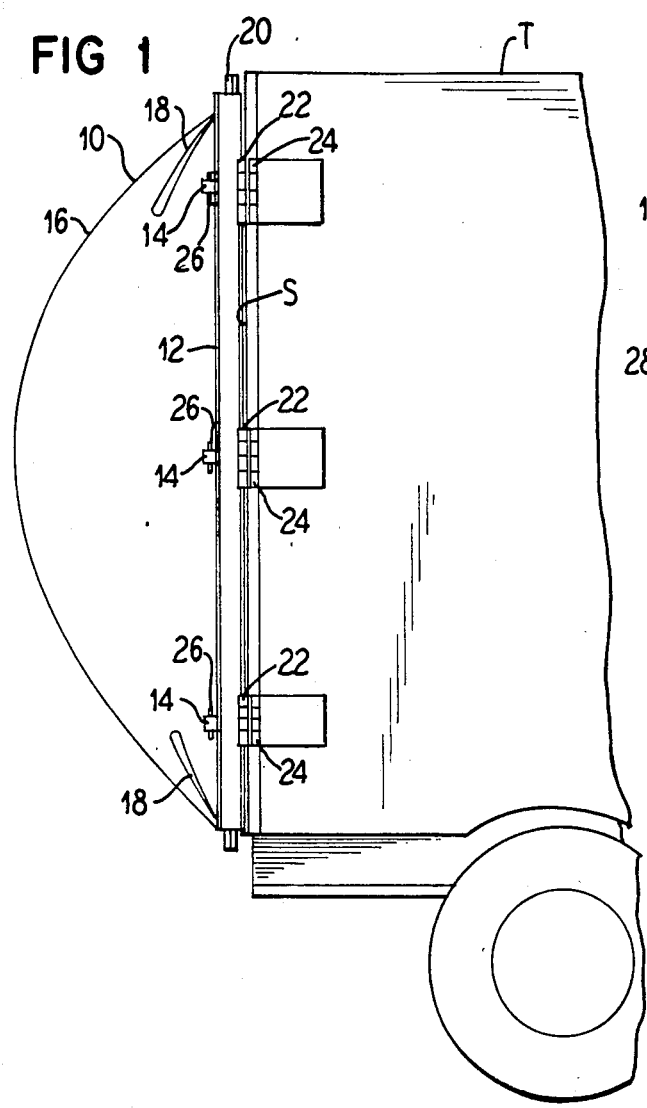
FIG. 1 is a side view of the rear portion of a tractor-trailer or other highway vehicle showing a drag reduction device according to the principles of the present invention, in an inflated state.

As shown in FIG. 1, the present invention includes a fabric enclosure, or envelope, 10 held by a mounting bracket, or clamp, 12 and mounting pins 14 to a rear surface S of a truck, such as a tractor-trailer truck T. The fabric enclosure 10 inflates as the truck T moves in a forward direction so that an outer surface 16 assumes a shape approximately that of a half ellipsoid. The shape is generated by seams 18 which are formed in the fabric 19 of the outer surface 16. It is also within the spirit of the present invention to use other shapes of fabric enclosures on correspondingly shaped rear surfaces on non-rectangular trucks and other highway vehicles.

The fabric enclosure 10 is mounted in a frame assembly 20 that is held adjacent the rear surface S of the truck T by the bracket 12 and thereby provides a surface 16 over which air can flow to reduce drag as the truck T travels. The bracket, or clamp, 12 is pivotally mounted to the truck T by hinges 22 at spaced locations, which in the illustrated embodiment are adjacent door hinges 24. Extending through the bracket 12, the mounting pins 14 include pegs 26 extending transversely of each mounting pin 14.

Figure 2:
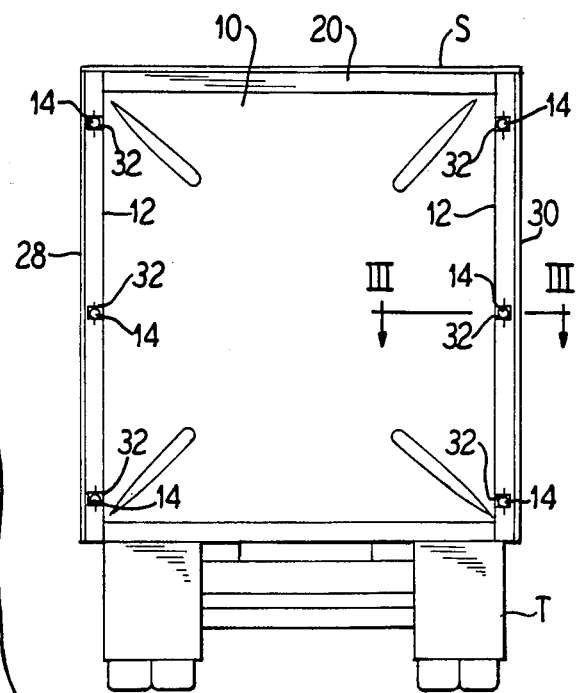
FIG. 2 is a rear elevational view of the tractortrailer and the drag reduction device shown in FIG. 1.

In FIG. 2, the entire rectangular rear surface S of the tractor-trailer truck T is covered by the fabric envelope 10 and the frame 20. The brackets, or clamps, 12 are provided at two opposite sides 28 and 30 and include slots 32 at the mounting pins 14, three of which are included at spaced locations on each side 28 and 30. Four seams 18 are shown, each extending from one of the four corners of the rectangular envelope 10.

Figure 3:
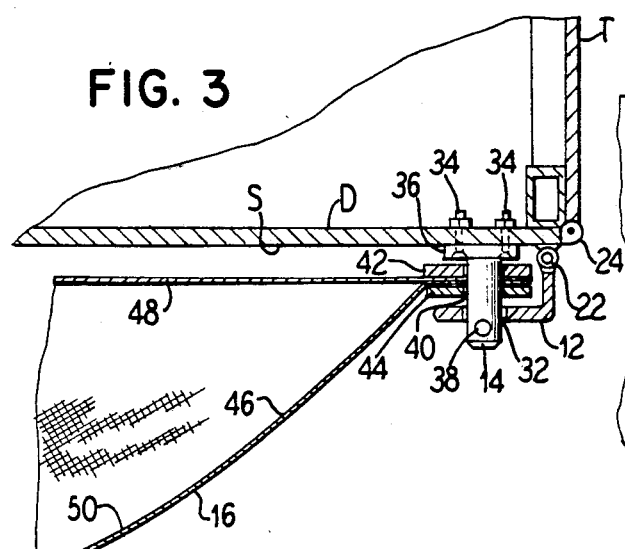
FIG. 3 is a fragmentary cross-section along lines III—III of FIG. 2 showing the present drag reduction device mounted on the rear of a tractor-trailer.

Referring now to FIG. 3, the rear surface S of the truck T has a door D that is pivotally attached to the truck T by the hinge 24. Secured to the door D by the hinge 22 is the clamp 12 which is pivotable between the securing position shown in FIG. 3 and a second position free of the mounting pin 14. The slot 32 in the clamp 12 provides clearance for the mounting pin 14 as the clamp 12 pivots about the hinge 22.

The mounting pin 14 is bolted to the door D by bolts 34 which extend through a pin base 36. At a free end of the mounting pin 14 is a transverse opening 38 through which the pegs 26, which are preferably quick-release type pins, are inserted. Instead of pegs 26, locks (not shown) can be used for added security. It is also within the scope of the present invention to provide other engaging means at the free ends of the mounting pins, including threaded engaging means and clip-type engaging means.

The mounting pin 14 extends through an opening 40 in the frame 20, which is made up of an inner frame 42 and an outer frame 44 between which is captured the edge of the fabric envelope 10. The fabric envelope 10 includes an outer shaped web 46 that forms the outer surface 16 over which air moves and an inner flat web 48 that lies adjacent the rear surface S.

The characteristics of fabric 19 from which the enclosure 10 is formed must be low air porosity, high windproofness, high water resistance, light weight and high strength. When deflated, the fabric 19 will hang limply on the frame assembly 20. As the tractor-trailer T, or other highway vehicle to which it is attached, moves along the highway, a differential in the air pressure on the outer surface 16 and an inner surface 50 of the shaped outer web 46 is created by the tendency of the moving vehicle T to create a vacuum to the rear of the vehicle T. This effect is well known in the field of fluid mechanics as the Bernoulli Effect.

As the vehicle T moves at highway speed, a substantial portion of the outer surface 16 of the outer web 46 is subject to a lower pressure than the inner surface 50 of the outer web 46. A central portion of the outer web 46 is subjected to a lower outer surface pressure and higher inner surface pressure than edge portions thereof, so that the outer web 46 will tend to inflate or stretch outward from the rear S of the vehicle T. The flat inner web 48 is stretched by the frame assembly 20 so that it remains substantially parallel to the rear surface S. Only an insignificant amount of air will pass through the fabric 19 forming the outer web 46 because of its low porosity. As these conditions are maintained by the vehicle's forward movement, complete inflation of the envelope 10 will be achieved.

The time required to achieve complete inflation will depend upon the acceleration and speed of the vehicle T. The air passing over the outer surface 16 of the fully inflated fabric enclosure 10 will be much less turbulent than the air passing around a vehicle T without such a drag reduction device, thereby reducing the amount of drag on the vehicle T.

It is to be understood that many different fabrics would be suitable for use in the present invention, including non-woven webs. One suitable fabric is the one marketed under the trademark "VERSATECH" and manufactured by Burlington Industries. The following characteristics of this fabric are important to the present invention:

| Weight: 2.8 Ounces/Square Yard | | |
|---|---|---|
| Testing Characteristics | | |
| TEST | ORIGINAL | RESULTS |
| WATER RESISTANCE | 800–900 mm | Highly |
| Suter Hydrostatic | | Water |
| Pressure | | Resistance |
| AATCC 127 - 1980 | | |
| Millimeters of mercury showing water pressure level before penetrating fabric. Scale is from 1–1500 mm. | | |
| WATER REPELLENCY | 100 | Durably |
| Spray Test | | Water |
| AATCC 22 - 1980 | | Repellant |
| Scale is 1 to 100. This test measures surface wetting only, not penetration. | | |
| WINDPROOFNESS | 1.5–2.5 cfm | Windproof |
| Air Porosity | | |
| Frazier Method | | |
| This test measures the cubic feet of air able to penetrate the weave. Air porosity has a direct correlation to windproofness. Ordinary nylon fabric used in windbreakers will yield between 3 and 6 cfm. | | |

The American Association of Textile Chemists and Colorists (AATCC), American Society for Testing and Materials (ASTM) and Frazier Method Tests are standard textile industry tests.

Any fabric whose characteristics approximate the foregoing should perform well in the present invention. However, it is to be understood that satisfactory performance can also be obtained from a fabric, or other web, whose characteristics vary widely from the above.

Figure 4:
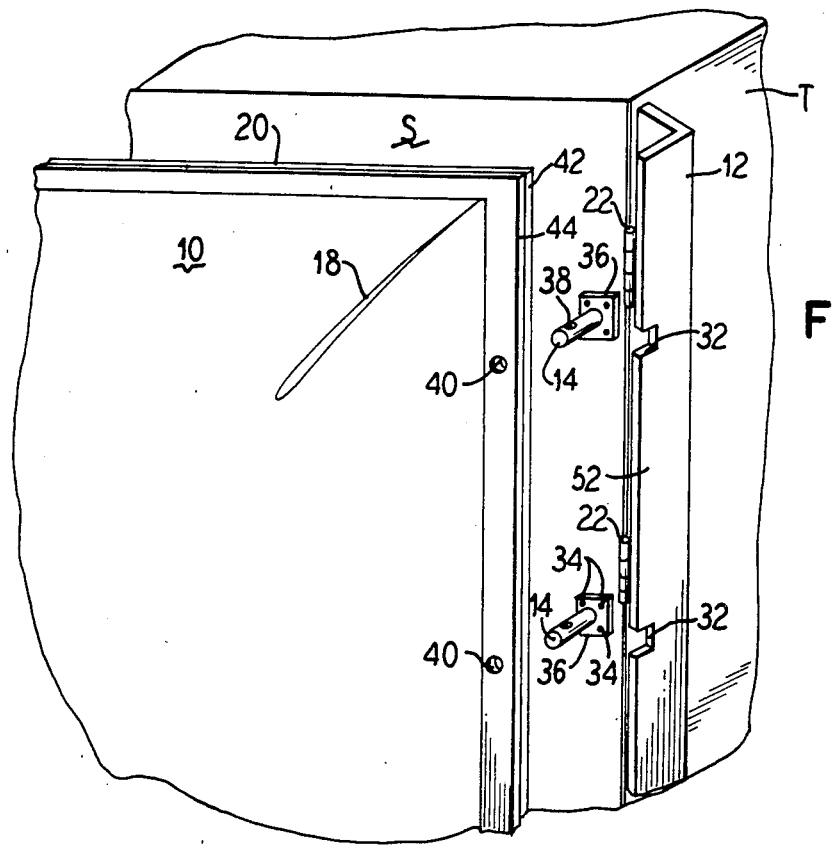
FIG. 4 is a partial perspective view of the present drag reduction device ready for mounting on a tractor-trailer.

In FIG. 4, in order to mount the fabric envelope 10 on the rear end surface S of the vehicle T, the holes 40 in the frame assembly 20 are inserted over the mounting pins 14, the clamps 12 are pivoted over the frame assembly 20, and pegs 26 or locks are inserted through the holes 38. Removal of the device is just as easy. The pegs 26 are removed and the clamps, or brackets, 12 are moved to the position shown in FIG. 4. The fabric enclosure 10 in the frame assembly 20 is then simply removed from the mounting pins 14.

The rectangular frame assembly 20 is held in place after mounting on the pins 14 by the clamps 12 of aluminum angle attached to vertical edges E of the vehicle's rear doors D by the hinges 22. The clamps 12 have the slots 32 in the non-hinged sides 52 to enable the clamps 12 to close over the rectangular frame assembly 20 with the mounting pins 14 fitting into the slots 32. The quick-release pegs 26 that fit into holes 38 formed transversely through the mounting pins 14 span the slots 32 to hold the clamp 12 in the position shown in FIG. 3 and, thereby, hold the fabric enclosure 10 to the truck T.

The construction of the fabric enclosure 10 and mounting details described for the preferred embodiment will allow for rapid and secure mounting of the fabric enclosure 10 on the vehicle T, as well as for rapid removal. However, it is to be understood that a wide variation of the construction and mounting details will not significantly affect the performance of the present invention. It is foreseen that the fabric enclosure 10 need not be completely removed from the truck T to provide access to the rear doors D. For instance, the clamp 12 on one side 28 or 30 may be opened, the locking mechanism for the doors D unlocked by reaching behind the fabric enclosure 10, and the door D to which the enclosure or envelope is still clamped, swung open on the hinges 24. Quick access to the contents of the truck T is thereby provided without having to completely remove the enclosure 10. Refastening of the enclosure 10 to the rear surface S can be accomplished by reversing the above steps.

Figure 5:
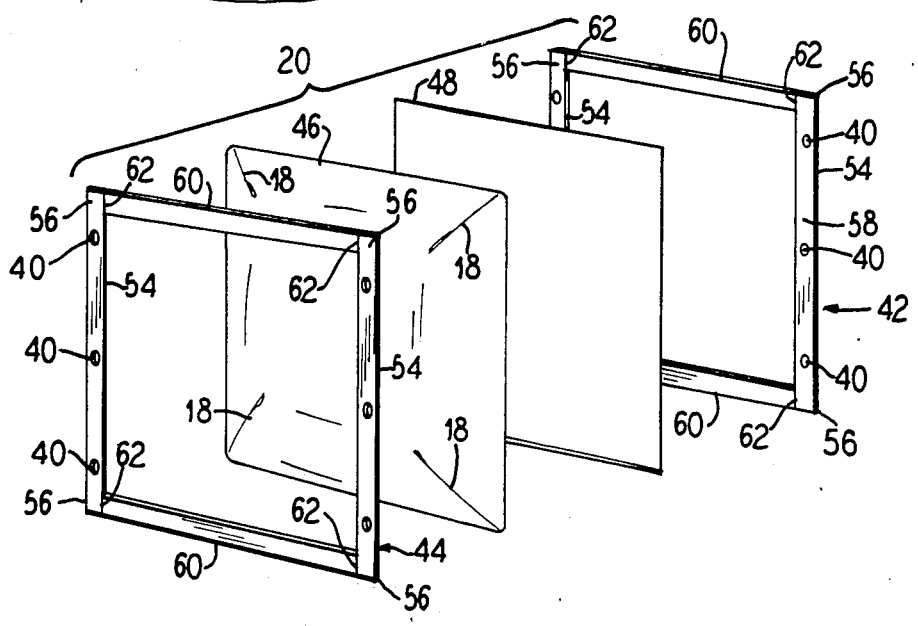
FIG. 5 is an exploded view of an envelope portion of the present device.

As shown in FIG. 5, the frame assembly 20 of the present invention comprises the first and second rectangular frames 44 and 42 formed of one-fourth inch by two and one-fourth inch aluminum bars 54 of lengths sufficient to cause the outer dimensions of the rectangular frames 44 and 42 to approximate the outer dimensions of the rectangular rear end surface S of the vehicle T to which it is to be mounted. Ends 56 of the four aluminum bars 54 comprising sides 58 of the rectangles are secured to each adjoining bar 60 by welds 62. A typical rectangular frame assembly 20 could have outer dimensions of seven feet five inches in width and nine feet in height.

The inner web 48 of the fabric enclosure 10 is comprised of a rectangular section of fabric 19 whose outer dimensions are the same as the outer dimensions of the rectangular frame assembly 20. To form the outer web 46 of the fabric enclosure 10, the fabric 19 is sewn at seams 18 to form a shape approximating that of a half ellipsoid. The outer web 46 is then sewn to the edges of the flat inner web 48 and the resulting fabric enclosure 10 is fastened securely between the two rectangular frames 42 and 44.

Figure 6:
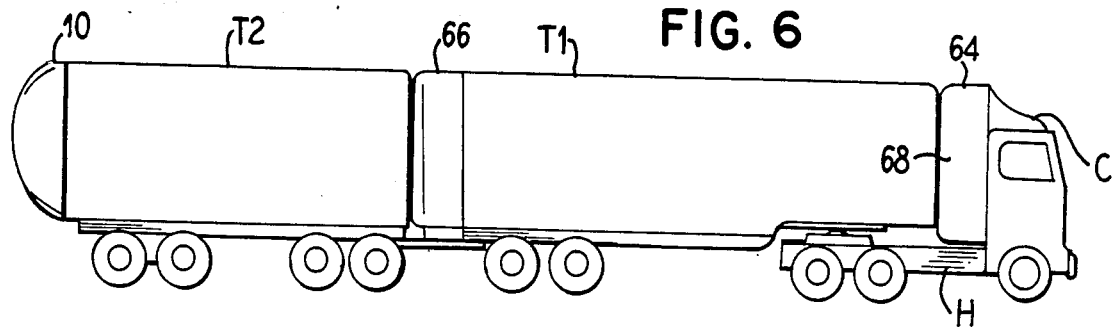
FIG. 6 is a diagrammatic side view of a tractor-trailer and second trailer including several embodiments of drag reduction devices according to the principles of the present invention.

Other embodiments of the present invention are shown in FIG. 6, including a second fabric enclosure 64 secured to the rear of a tractor cab and fairing C and a third fabric enclosure 66 secured between a first and a second trailer T1 and T2 of a tandem trailer rig.

The second enclosure 64 is shaped to avoid the trailer mounting hitch H and any connecting wires and hoses that extend between the cab C and the first trailer T1. As such, it may have somewhat of an inverted U shape. Sides 68 of the second enclosure are formed to extend from the cab C and the trailer T1 and, thereby, provide a more continuous surface between the cab C and the first trailer T1 to reduce air turbulence and drag.

Likewise, the third fabric enclosure 66 extends between the first and second trailers T1 and T2 to provide a more continuous air flow surface and to reduce drag. Both the second and third enclosure 64 and 66 have outer surface webs that assume a cushion shape when inflated due to the arrangement of seams. Rearward most surfaces of the second and third enclosures 64 and 66 abut the front surfaces of the respective trailers T1 and T2 to, thereby, further shape the enclosures 64 and 66. During turning of the truck T, the enclosures 64 and 66 flex and are not damaged.

The first fabric enclosure 10 is shown at the rear of the second trailer T2.

Figure 7:
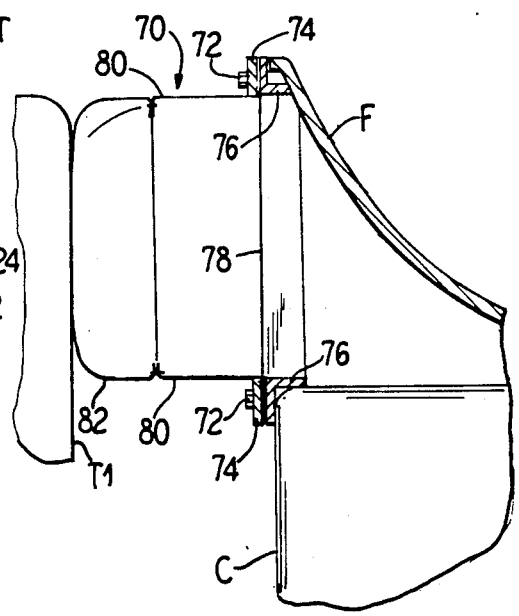
FIG. 7 is a vertical cross-section partial side view of another embodiment of the present device shown mounted on a fairing.

In FIG. 7, another embodiment of a fabric enclosure 70 is shown mounted to the rear surface of a fairing F at the to of a truck cab C. The enclosure 70 need not have the quick mounting and unmounting features of the earlier described embodiments and, thus, is secured thereto somewhat more permanently by bolts 72, which extend through a frame 74 to secure the envelope 70 to a bracket 76 at the perimeter of the fairing F. The embodiment illustrated in FIG. 7 may include an inner web 78, although one is not required. Parallel side walls 80 are provided on a shaped outer web 82 so that the outer web 82 extends to and abuts the trailer T1.

Although modifications and changes may be suggested by those skilled in the art, it is the intention of the inventor to embody within the patent warranted hereon all changes and modifications as reasonably and properly come within the scope of his contribution to the art.

I claim as my invention:

1. An air drag reducing apparatus for mounting on rearwardly directed surfaces of trucks, comprising:
    an inflatable enclosure formed of first and second flexible webs, said first flexible web being flat and mountable directly adjacent and substantially parallel to said rearwardly directed truck surface, said second flexible web being shaped to inflate to a half ellipsoid shape and mountable to extend from said rearwardly directed truck surface;
    a frame corresponding in size and shape to said rearwardly directed truck surface on which said apparatus is to be mounted, said frame having an inner frame member and a like-shaped outer frame member, each of aluminum, edges of said inflatable enclosure being held between said inner and outer frame members, spaced opposite portions of said frame defining a plurality of through extending holes,
    a plurality of mounting pins fastened to said rearwardly directed truck surface to each extend through one of said plurality of through extending holes in said frame when said frame is on said rearwardly directed truck surface,
    a pair of brackets hingedly mountable at opposite edges of said rearwardly directed truck surface corresponding to said spaced opposite portions of said frame, said brackets being pivotable over said spaced opposite portions of said frame when said frame is on said rearwardly directed truck surface, said brackets having slots in registration with said plurality of through extending holes in said frame to provide clearance for said mounting pins when said brackets are pivoted over said frame; and
    means for cooperative engagement with free ends of said mounting pins for holding said brackets over said frame,
whereby said enclosure inflates to form an air flow surface as the truck moves in a forward direction.

2. An air drag reducing apparatus as claimed in claim 1, wherein said cooperative engagement means includes quick-release pins, and transverse holes through said mounting pins for mounting said quick-release pins.

3. An air drag reducing apparatus as claimed in claim 1, wherein said first and second flexible webs are of woven wind-resistant, water-resistant fabric.

* * * * *